US012689149B1

(12) United States Patent
Wu

(10) Patent No.: US 12,689,149 B1
(45) Date of Patent: Jul. 21, 2026

(54) DRIVE SHAFT FOR A RETRACTABLE POWER PLUG

(71) Applicant: Xuexiang Wu, Guangdong (CN)

(72) Inventor: Xuexiang Wu, Guangdong (CN)

( * ) Notice: Subject to any disclaimer, the term of this patent is extended or adjusted under 35 U.S.C. 154(b) by 0 days.

(21) Appl. No.: 19/308,169

(22) Filed: Aug. 22, 2025

(51) Int. Cl.

| | |
|---|---|
| ***H01R 13/50*** | (2006.01) |
| ***H01R 13/502*** | (2006.01) |
| ***H01R 24/76*** | (2011.01) |
| *H01R 103/00* | (2006.01) |

(52) U.S. Cl.
CPC .......... *H01R 13/502* (2013.01); *H01R 24/76* (2013.01); *H01R 2103/00* (2013.01)

(58) Field of Classification Search
CPC ............................ H01R 13/44; H01R 13/4538
USPC ................................ 439/130, 310, 264, 262
See application file for complete search history.

(56) References Cited

U.S. PATENT DOCUMENTS 3,217,211 A * 11/1965 Norden .................... H02B 1/36 439/378
7,124,505 B2 * 10/2006 Friesen .............. H01R 13/6315 29/877
7,485,003 B2 * 2/2009 Mandrusov ........ H01R 13/6315 439/607.41
8,246,372 B1 * 8/2012 Walters ................ H01R 13/622 439/310
2023/0318219 A1 * 10/2023 Ruan ...................... H01R 24/68 439/131

* cited by examiner

*Primary Examiner* — Phuong K Dinh
(74) *Attorney, Agent, or Firm* — Hawaii Patent Services; Nathaniel K. Fedde; Kenton N. Fedde

(57) ABSTRACT

The present disclosure discloses a drive shaft for a retractable power plug, comprising a shaft body and a connector. The outer surface of the shaft body is provided with a first helical sliding groove and a second helical sliding groove in the axial direction. When the drive shaft rotates, the first abutment block in the first helical sliding groove and the second abutment block in the second helical sliding groove interact, moving together in the axial direction of the shaft body. By rotating the shaft body, the present disclosure synchronously achieves the overall lifting of the socket body and the extension/retraction of the plug terminal, significantly simplifying the structure and improving reliability.

20 Claims, 20 Drawing Sheets

DRIVE SHAFT FOR A RETRACTABLE POWER PLUG

TECHNICAL FIELD

The present disclosure belongs to the technical field of electrical connectors and particularly relates to a drive shaft for a retractable power plug.

BACKGROUND

With the widespread use of portable electronic devices such as smartphones, laptops, tablets, and power tools, their accompanying chargers and power adapters have become indispensable items for daily travel. One of the core components of these chargers is the AC power plug used to connect to the mains.

Currently, the mainstream charger plugs on the market mostly feature fixed and exposed metal pins (or safety pins, plug pins). This design has significant drawbacks during transportation, storage, and post-use stowage, including susceptibility to pin damage, inconvenience in carrying, and potential harm to other items. To address these issues, the industry has proposed some solutions involving retractable plugs, aiming to improve portability and protection by retracting the pins into the housing. However, existing retractable plug designs commonly suffer from a critical flaw: structural complexity. Such designs typically rely on a plurality of independent retraction mechanisms (e.g., springs, latches, sliders, links, etc.), intricate locking devices, and precise guiding structures to achieve synchronous retraction and reliable locking of single or a plurality of pins. This complexity leads to the following problems:

1. The assembly process is cumbersome, increasing production difficulty and manufacturing costs.

2. Reliability challenges arise as excessive moving parts and connection points heighten the risks of mechanical failure, wear, and jamming, making it difficult to ensure long-term stability and durability.

3. The intricate internal structure may occupy valuable space, hindering the miniaturization design of chargers.

SUMMARY

The present disclosure provides a drive shaft for a retractable power plug to solve the problems raised in the background art.

To achieve the above object, the present disclosure adopts the following technical solutions:

The present disclosure discloses a drive shaft for a retractable power plug, comprising a shaft body and a connector. The shaft body is provided with a first helical sliding groove and a second helical sliding groove in an axial direction on an outer surface thereof. The first helical sliding groove and the second helical sliding groove have overlapping orthographic projections in a same direction, forming a transition groove section at an intersection of the projections. The first helical sliding groove is configured to guide a first abutment block engaged therewith to move in the axial direction of the shaft body. The second helical sliding groove is configured to guide a second abutment block engaged therewith to move in the axial direction of the shaft body. The connector is arranged at one end of the shaft body for rotatably installing the drive shaft onto a power plug, enabling the drive shaft to rotate around the axial direction of the shaft body. When the drive shaft rotates, the first abutment block in the first helical sliding groove and the second abutment block in the second helical sliding groove interact, moving together in the axial direction of the shaft body. By rotating the shaft body, the present disclosure synchronizes the vertical movement of the socket body and the extension/retraction of the plug terminal, significantly simplifying the structure and improving reliability.

The beneficial effects of the present disclosure compared to the prior art are as follows:

1. Through the single action of rotating the drive ring, the vertical movement of the socket body and the horizontal extension/retraction of the plug terminal are synchronously driven, replacing traditional multi-stage independent mechanisms (such as a combination of springs, snaps and links). The reduced number of parts significantly lowers assembly difficulty and manufacturing costs.

2. The vertical movement of the socket body is forcibly converted into the extension/retraction motion of the plug terminal through the engagement of the fixed rod with the helical groove of the bidirectional screw rod, eliminating the need for additional driving components. The locking mechanism formed by the limiting stopper and limiting notch ensures precise positioning and prevents misoperation, while the spring-assisted reset guarantees smooth retraction.

BRIEF DESCRIPTION OF DRAWINGS

The drawings, which form part of this application, are included to provide further understanding of the present disclosure. The illustrative embodiments and descriptions thereof are intended to explain the present disclosure and do not constitute undue limitations. In the drawings.

REFERENCE SIGNS

Figure 1:
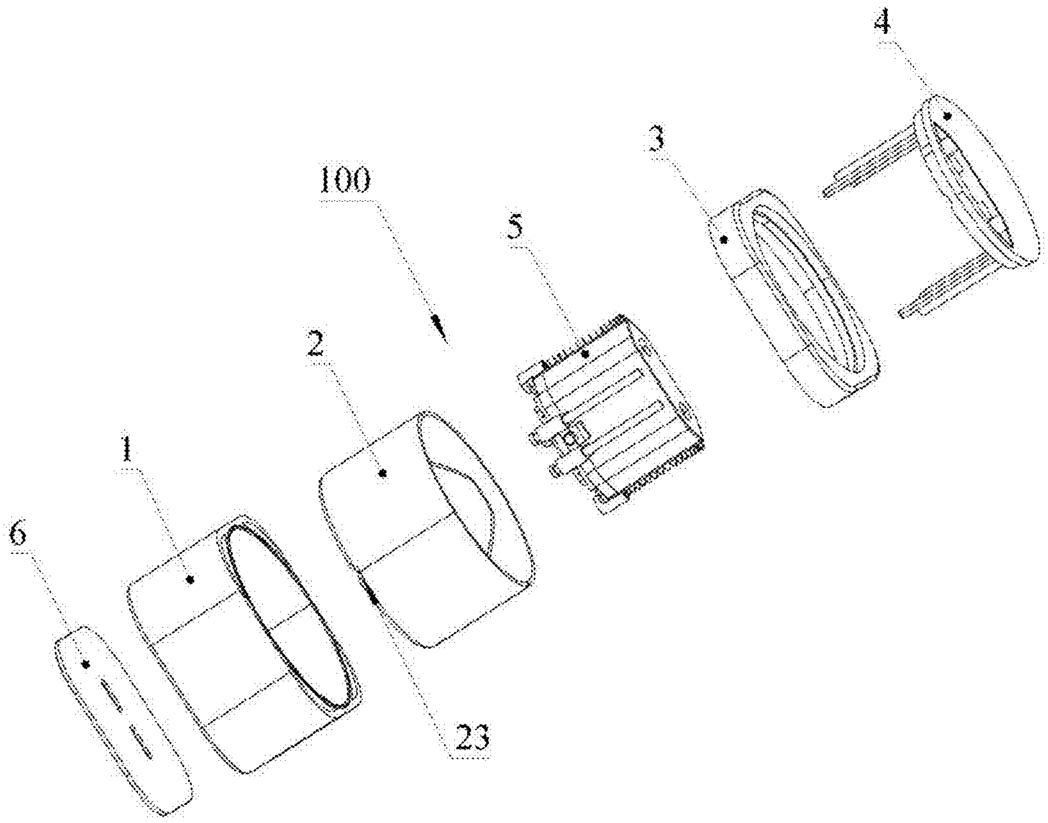
FIG. 1 is an exploded view of the plug provided by the present disclosure.

- Plug 100;
- Base Housing 1, Base Plate 11, Side Wall 12, Accommodation Cavity 13, Annular Sliding Track 131, Limiting Stopper 132;
- Drive Ring 2, First Engagement Groove 21, Lifting Guide Rail 22, Limiting Notch 23;
- Upper Rotating Cover 3, First Engagement Protrusion 31, Central Hole 32, Upper Limiting Flange 33;
- Fixed Cover 4, Central Fixed Shaft 41, Lower Limiting Flange 42, Socket Extension Hole 43;
- Socket Body 5, Drive Slider 51, Guide Bushing 52, Sliding Sleeve 53, Main Housing 54, Upper Housing 541, Lower Housing 542, Accommodation Space 55, First Through Hole 56, Movable Seat 57, Plug Terminal 58, Second Through Hole 60, Bidirectional Screw Rod 61, First Abutment Block 62, First Helical Sliding Groove 63, Second Abutment Block 64, Second Helical Sliding Groove 65, Accommodation Part 66, Abutment Part 67, Return Spring 68, Shaft Body 69, Transition Groove Section 70, Connector 71, Rotary Groove 72;
- Base Cover 6, Guide Rod 8, First Fixed Rod 9, Second Fixed Rod 10.

DESCRIPTION OF EMBODIMENTS

The technical solution in the embodiment of the present disclosure will be clearly and completely described below with reference to the drawings. Obviously, the described embodiment is part of, rather than all of the embodiments of the present disclosure. The following description of at least one exemplary embodiment is illustrative in nature and is in no way intended to limit the present disclosure, its application or uses. Based on the embodiments in the present disclosure, all other embodiments obtained by those skilled in the art without creative work belong to the scope of protection of the present disclosure.

It should be noted that the terminology used here is only for describing specific embodiments, and is not intended to limit exemplary embodiments according to the present application. As used herein, the singular form is also intended to include the plural form unless the context clearly indicates otherwise. Furthermore, it should be appreciated that when the terms "comprising" and/or "including" are used in this specification, they specify the presence of features, steps, operations, devices, components and/or combinations thereof.

Unless otherwise specified, the relative arrangement of components and steps, numerical expressions and numerical values set forth in these embodiments do not limit the scope of the present disclosure. At the same time, it should be appreciated that for the convenience of description, the dimensions of various parts shown in the drawings are not drawn according to the actual scale relationship. Techniques, methods and equipment known to those skilled in the art may not be discussed in detail, but in appropriate cases, they should be regarded as part of the authorization specification. In all the examples shown and discussed herein, any specific values should be interpreted as illustrative, and not as limiting. Therefore, other examples of exemplary embodiments may have different values. It should be noted that similar numbers and letters indicate similar items in the following drawings, therefore once an item is defined in one drawing, it does not need to be further discussed in subsequent drawings.

The present disclosure belongs to the technical field of electrical connectors and specifically relates to a retractable plug structure for power adapters or chargers of electronic devices. The plug is ingeniously designed, integrating functions such as rotary drive, linear lifting, internal plug extension/retraction, and automatic reset.

Figure 2:
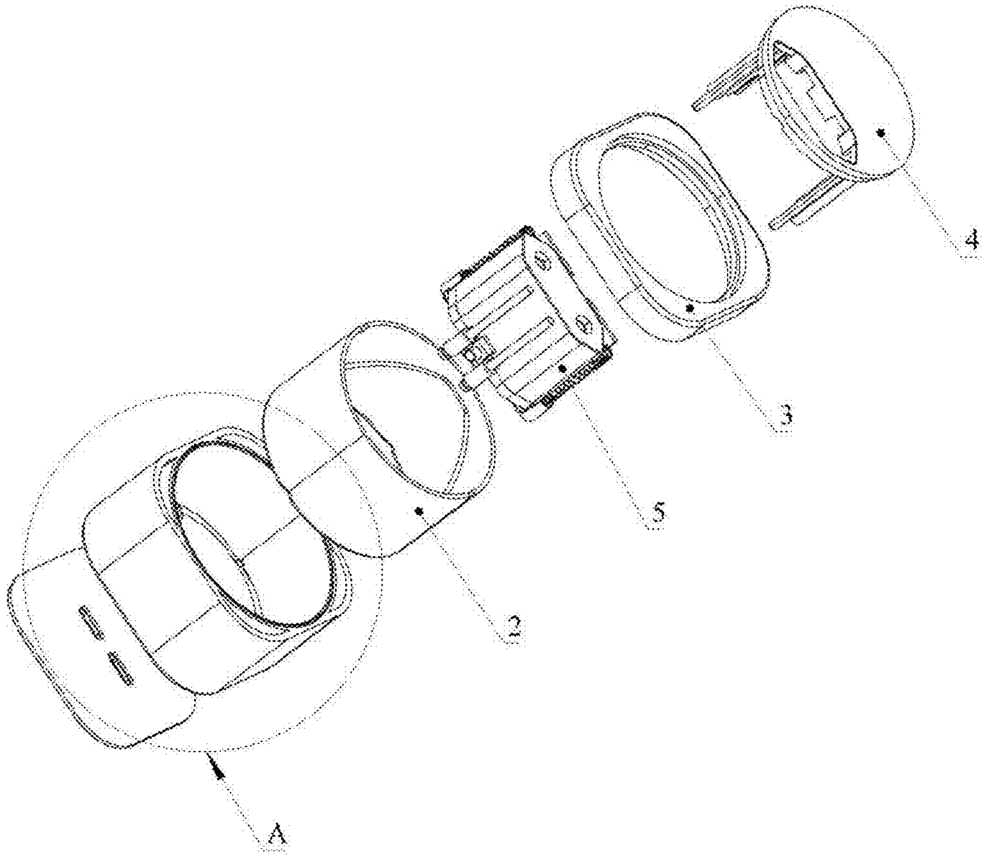
FIG. 2 is another exploded view of the plug provided by the present disclosure.
Figure 3:
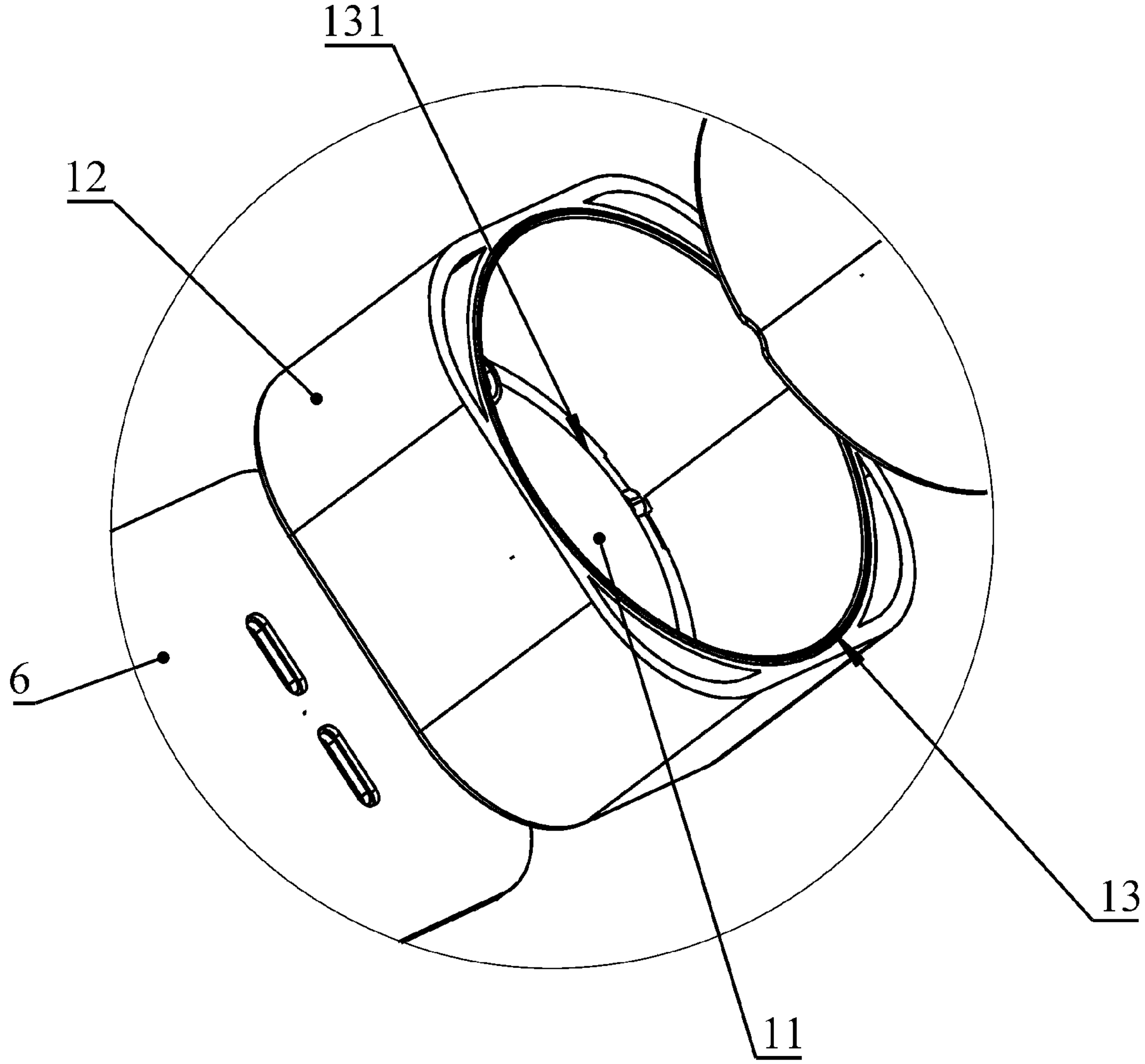
FIG. 3 is an enlarged view of section A in FIG. 2.

As shown in FIGS. 1, 2, and 3, the plug mainly includes a base housing 1, a drive ring 2, an upper rotating cover 3, a fixed cover 4, a socket body 5 and a base cover 6.

The base housing 1 serves as the foundational framework of the plug 100, with its main body consisting of a base plate 11 and an annular side wall 12 extending upward from the edge of the base plate 11. The base plate 11 and the side wall 12 together enclose an accommodation cavity 13 with a top opening. The inner surface of the base plate 11 facing the accommodation cavity 13 is provided with an annular sliding track 131. A base cover 6 is arrange on the side of the base plate 11 away from the accommodation cavity 13, and the base cover 6 is configured to seal the base plate 11, enhancing the overall aesthetic appeal. It is noted that base housing 1 is labeled in FIG. 1, while its components, base plate 11, annular side wall 12, accommodation cavity 13, and annular sliding track 131, are labeled in FIG. 3.

The drive ring 2 is an annular component positioned within the accommodation cavity 13. Under normal conditions, the drive ring 2 rests on the annular sliding track 131 of the base plate 11 due to its own gravity. When driven by an external force, the drive ring 2 can smoothly rotate circumferentially along the annular sliding track 131, which defines the motion trajectory of the drive ring 2.

Figure 4:
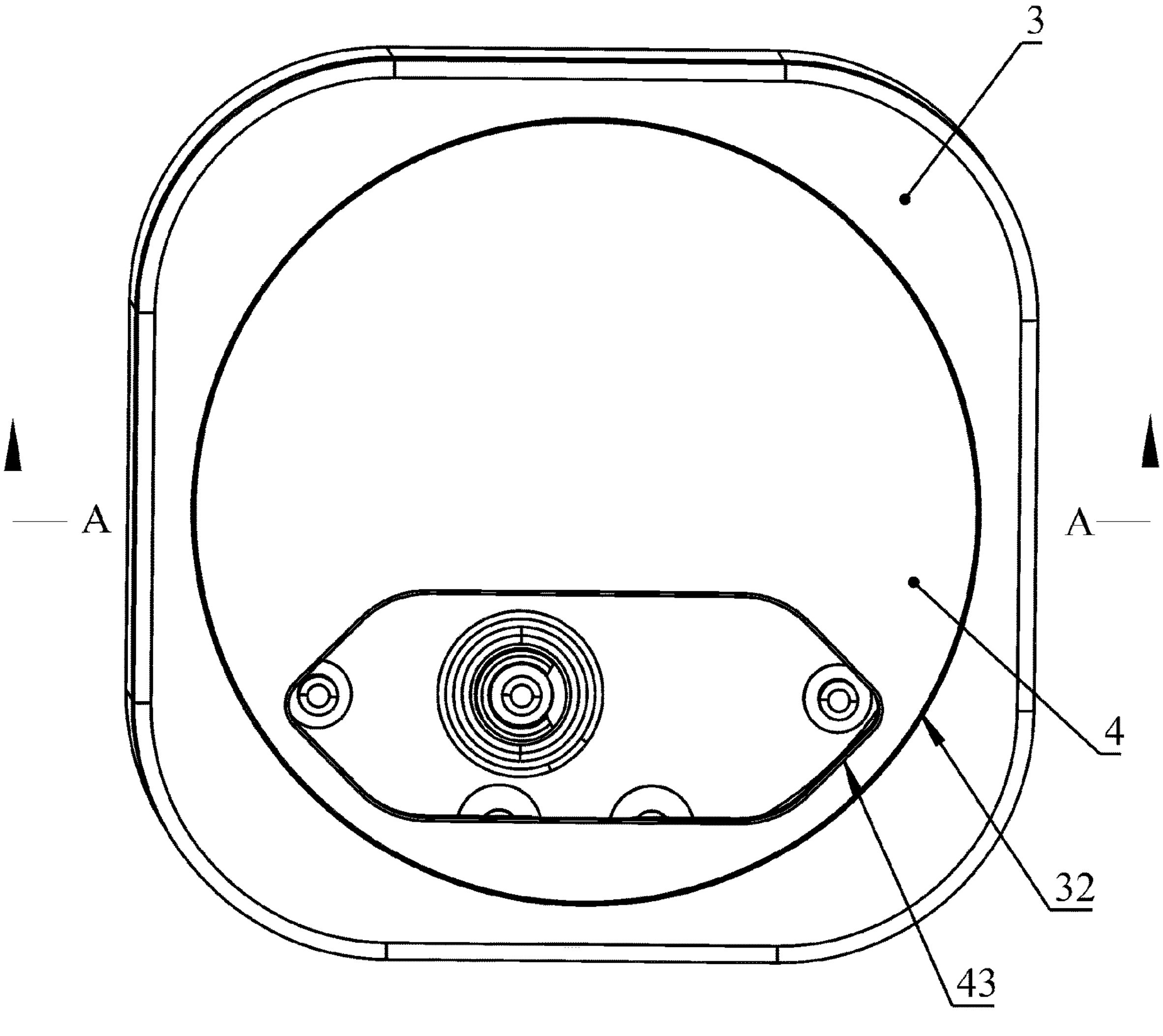
FIG. 4 is a partial structural diagram of the plug of the present disclosure.
Figure 5:
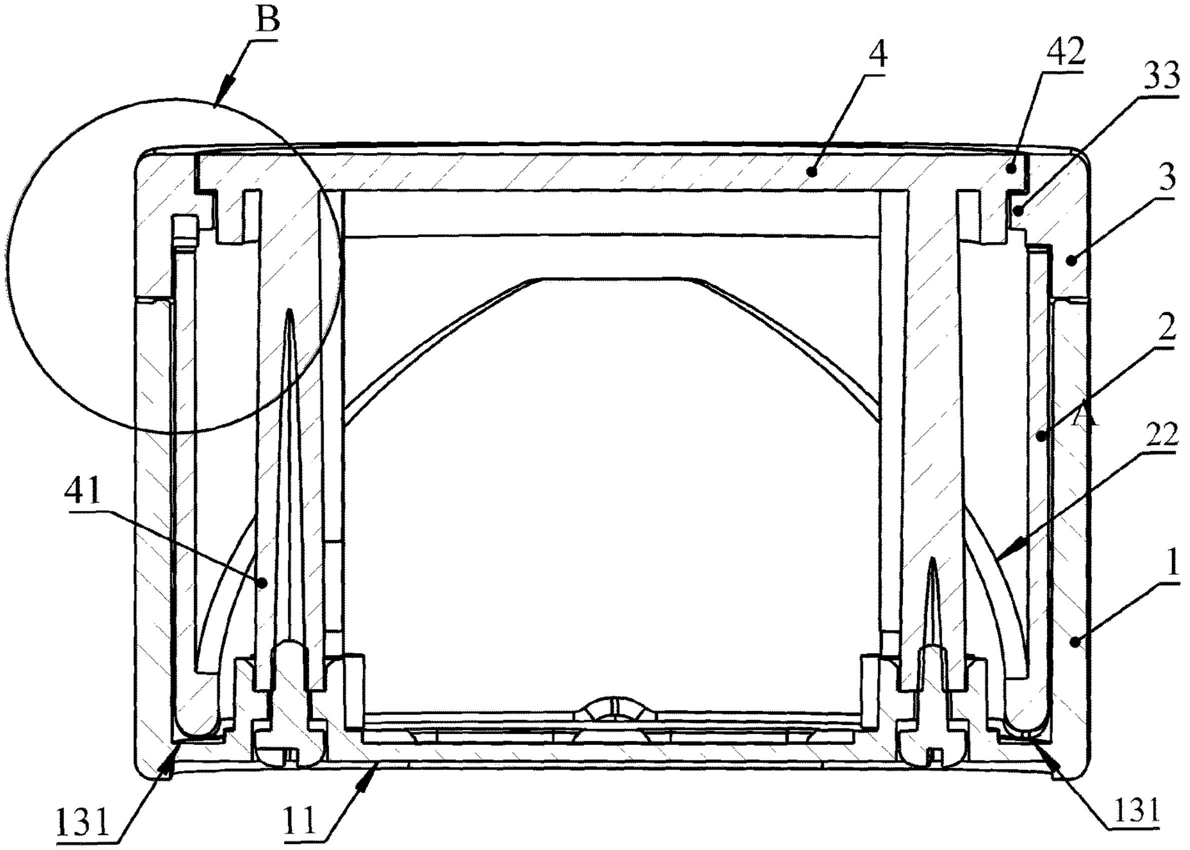
FIG. 5 is a cross-sectional view taken along line A-A in FIG. 4.
Figure 6:
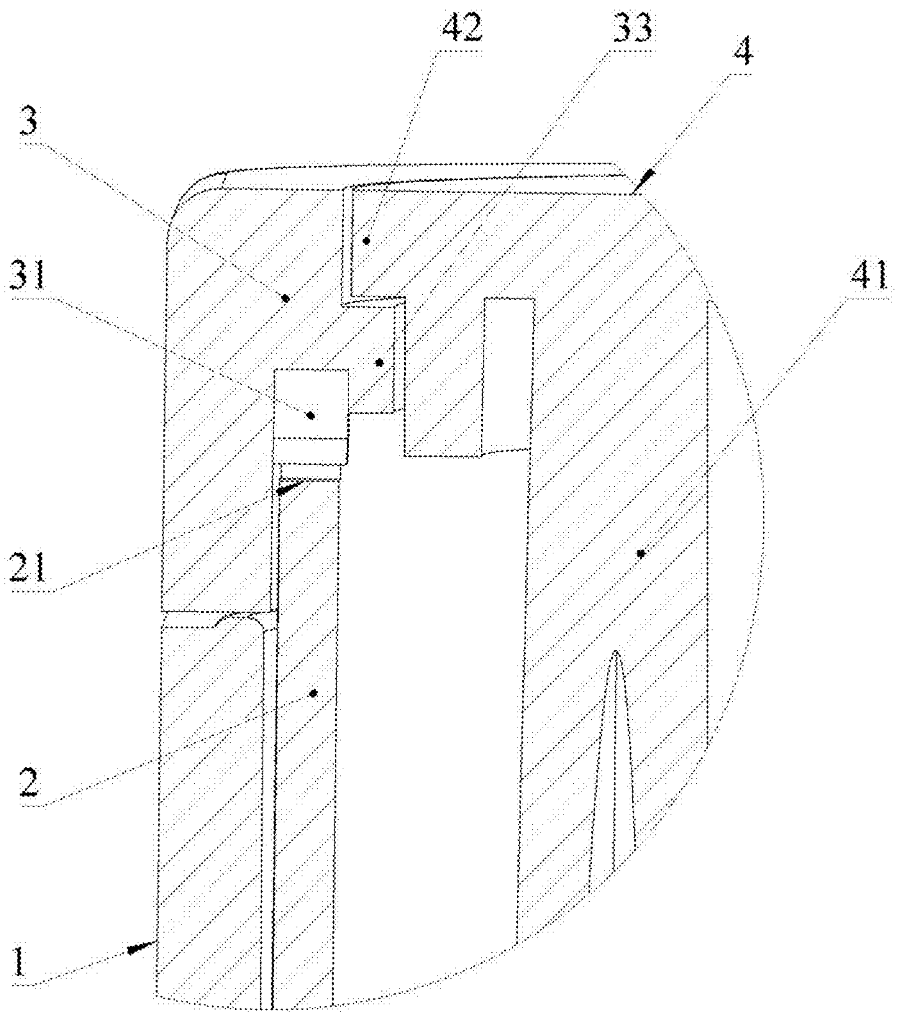
FIG. 6 is an enlarged view of section B in FIG. 5.
Figure 7:
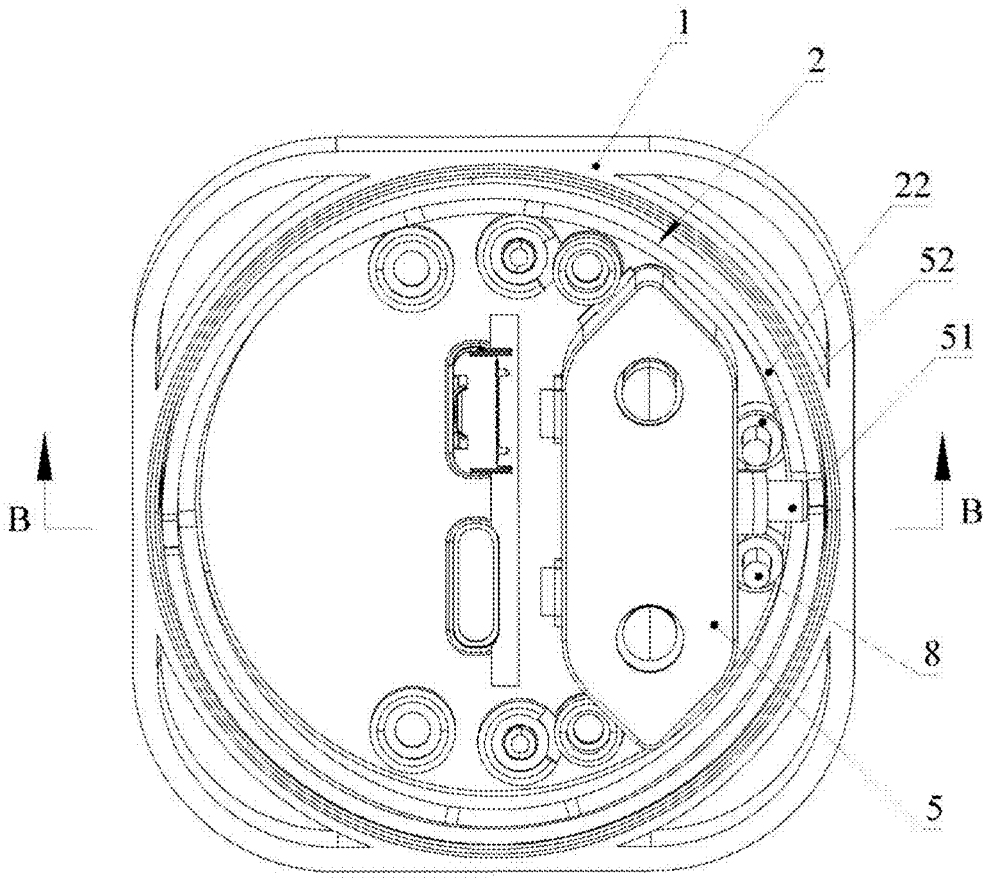
FIG. 7 is a partial structural diagram of the plug of the present disclosure.
Figure 8:
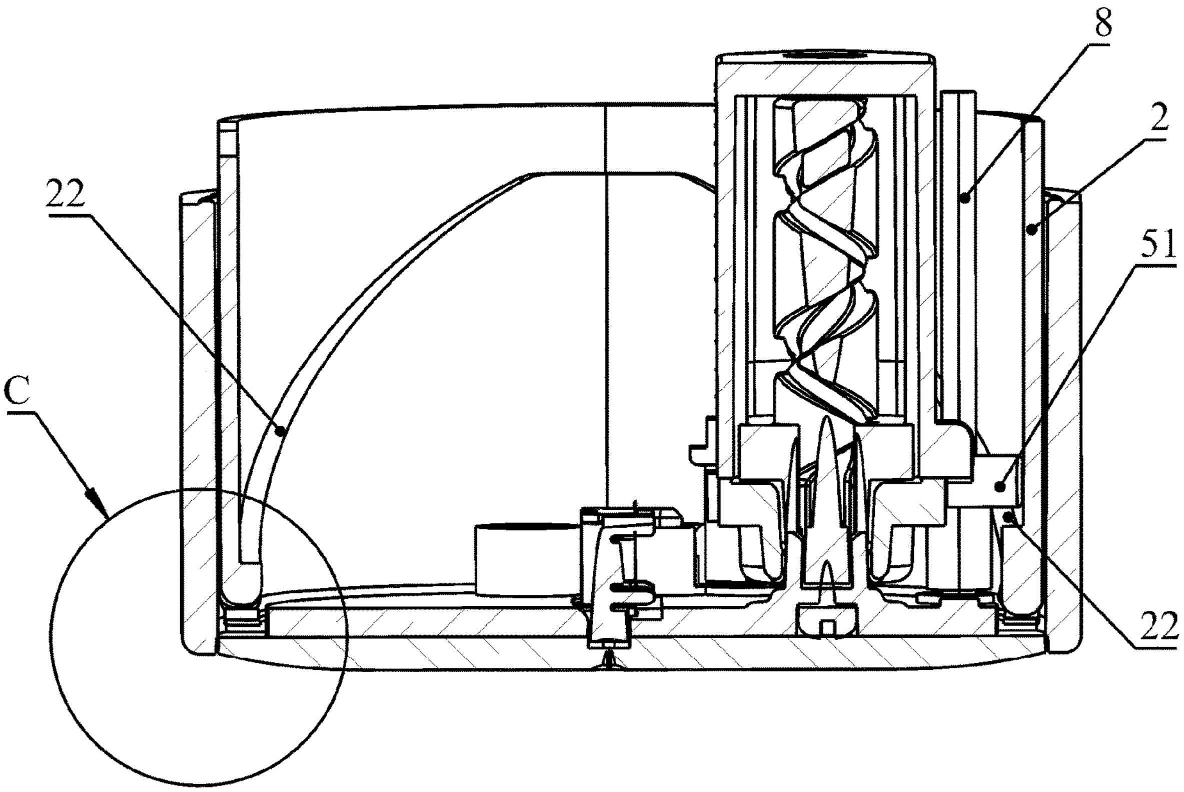
FIG. 8 is a cross-sectional view taken along line B-B in FIG. 7.
Figure 9:
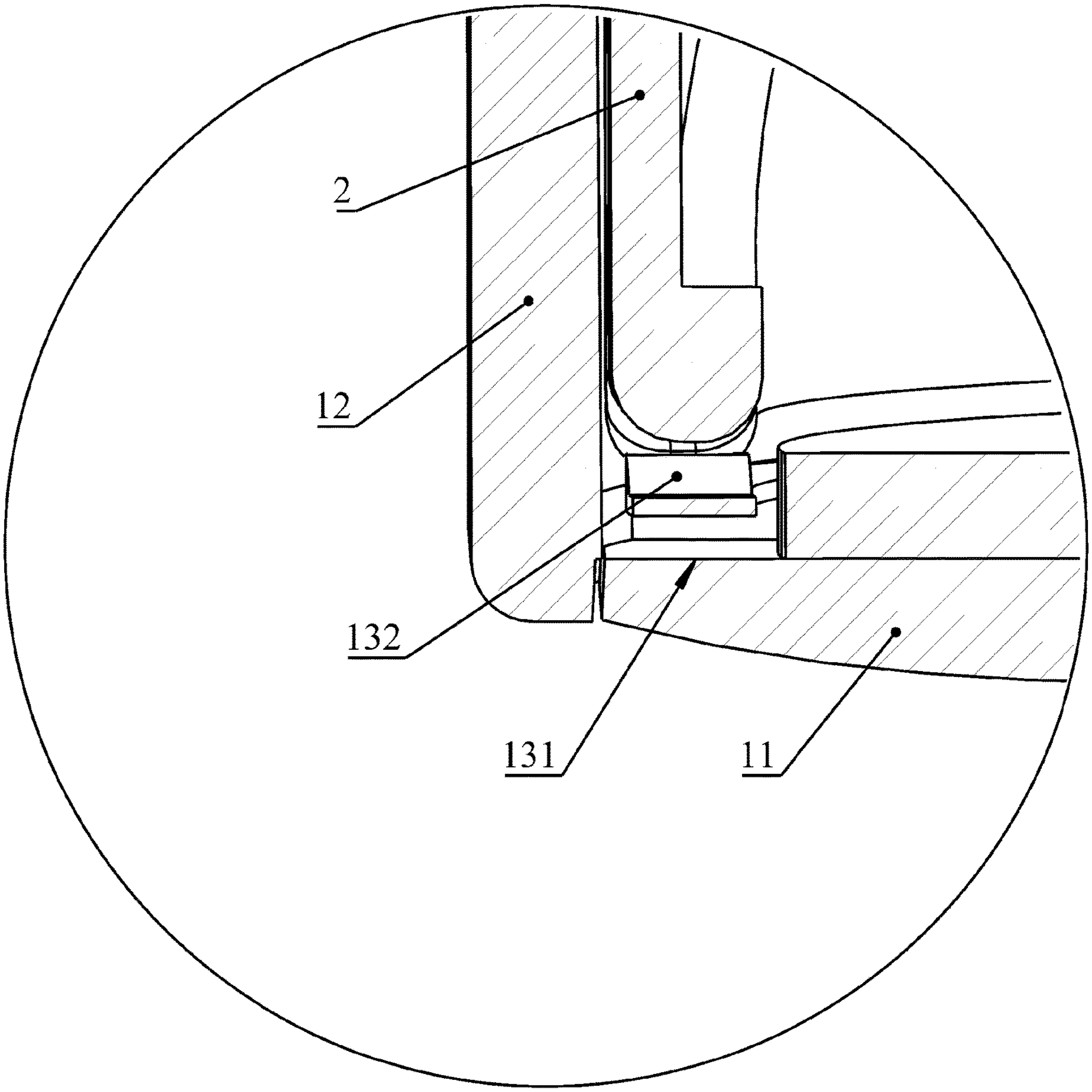
FIG. 9 is an enlarged view of section C in FIG. 8.
Figure 10:
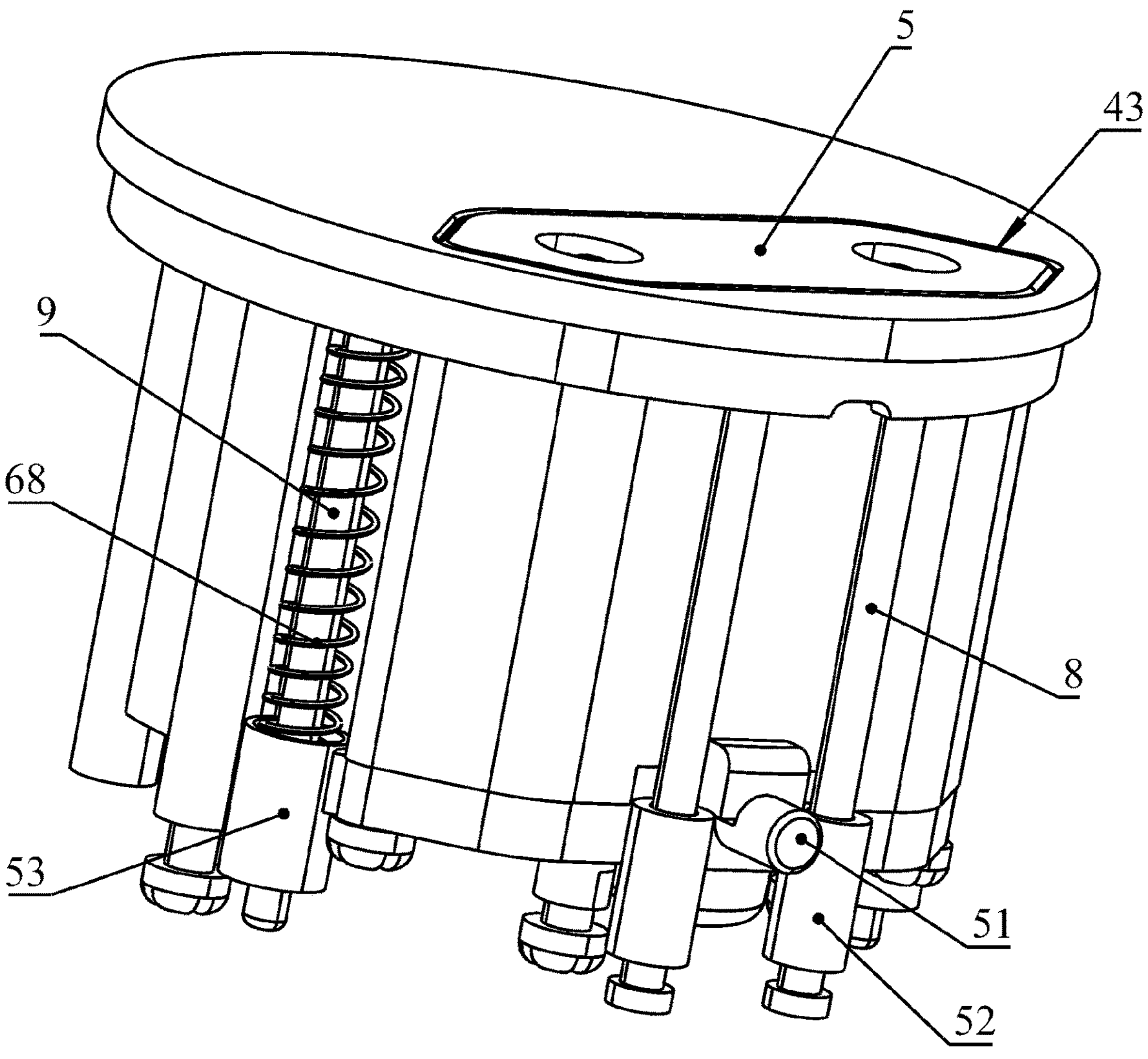
FIG. 10 is a partial schematic structural diagram of the socket body and fixed cover shown in FIG. 1, along with additional parts which may be combined with the socket body and fixed cover before installation with the other parts shown in FIG. 1.
Figure 11:
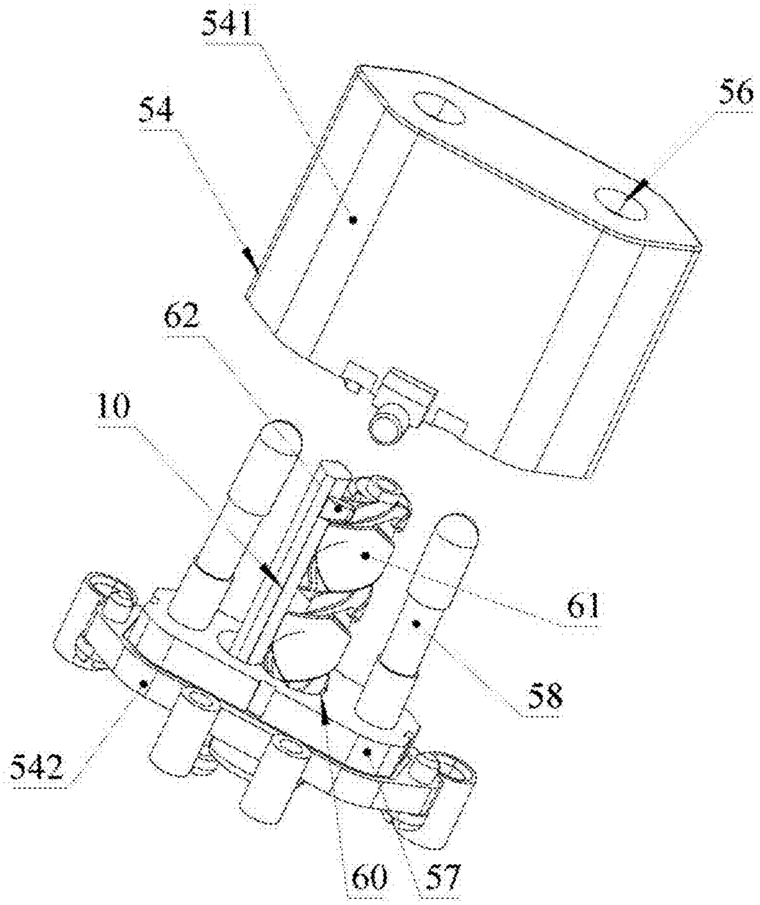
FIG. 11 is an exploded schematic diagram of the socket body shown in FIG. 1.
Figure 12:
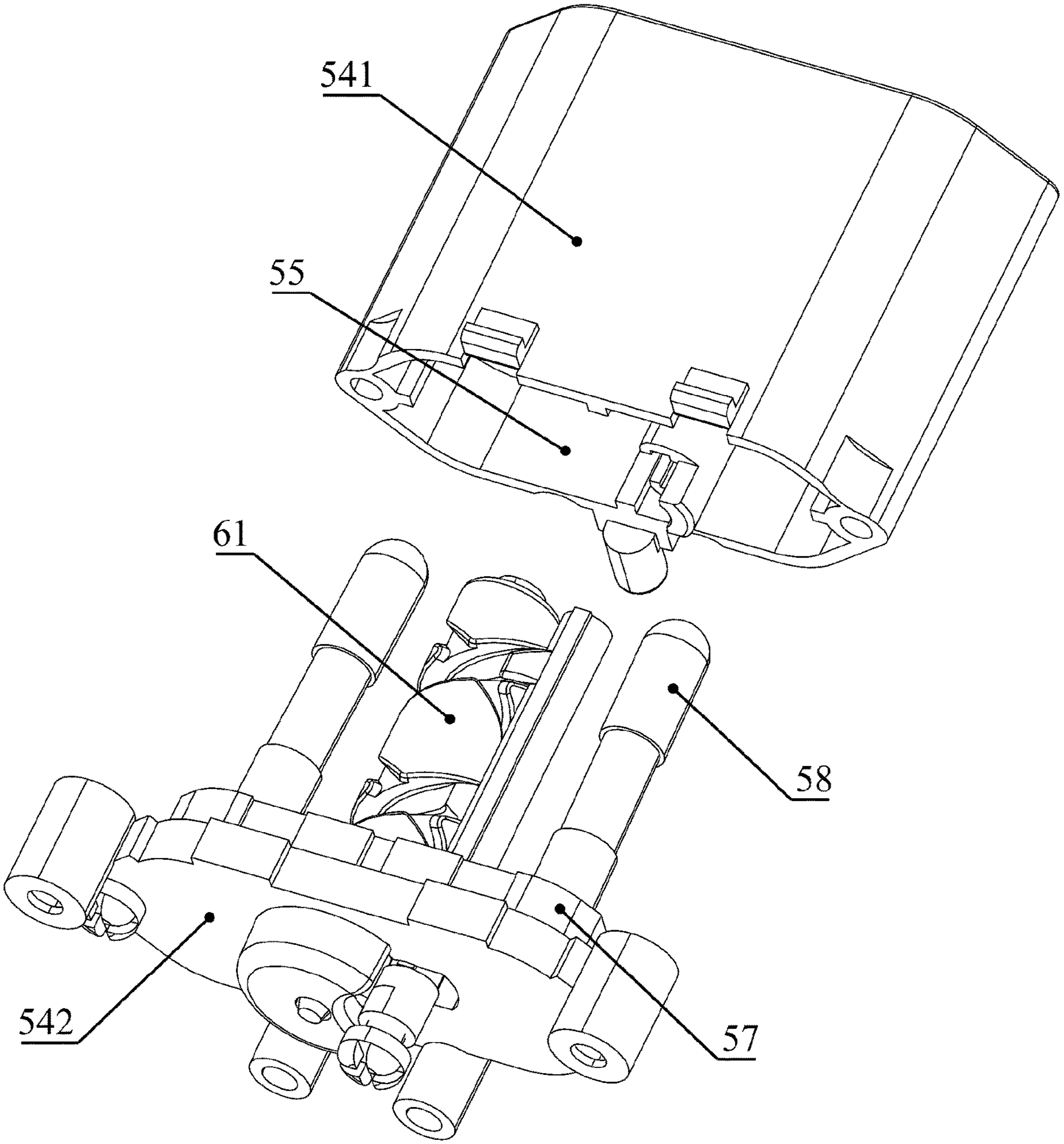
FIG. 12 is an exploded schematic diagram of the socket body shown in FIG. 11 from another angle.
Figure 13:
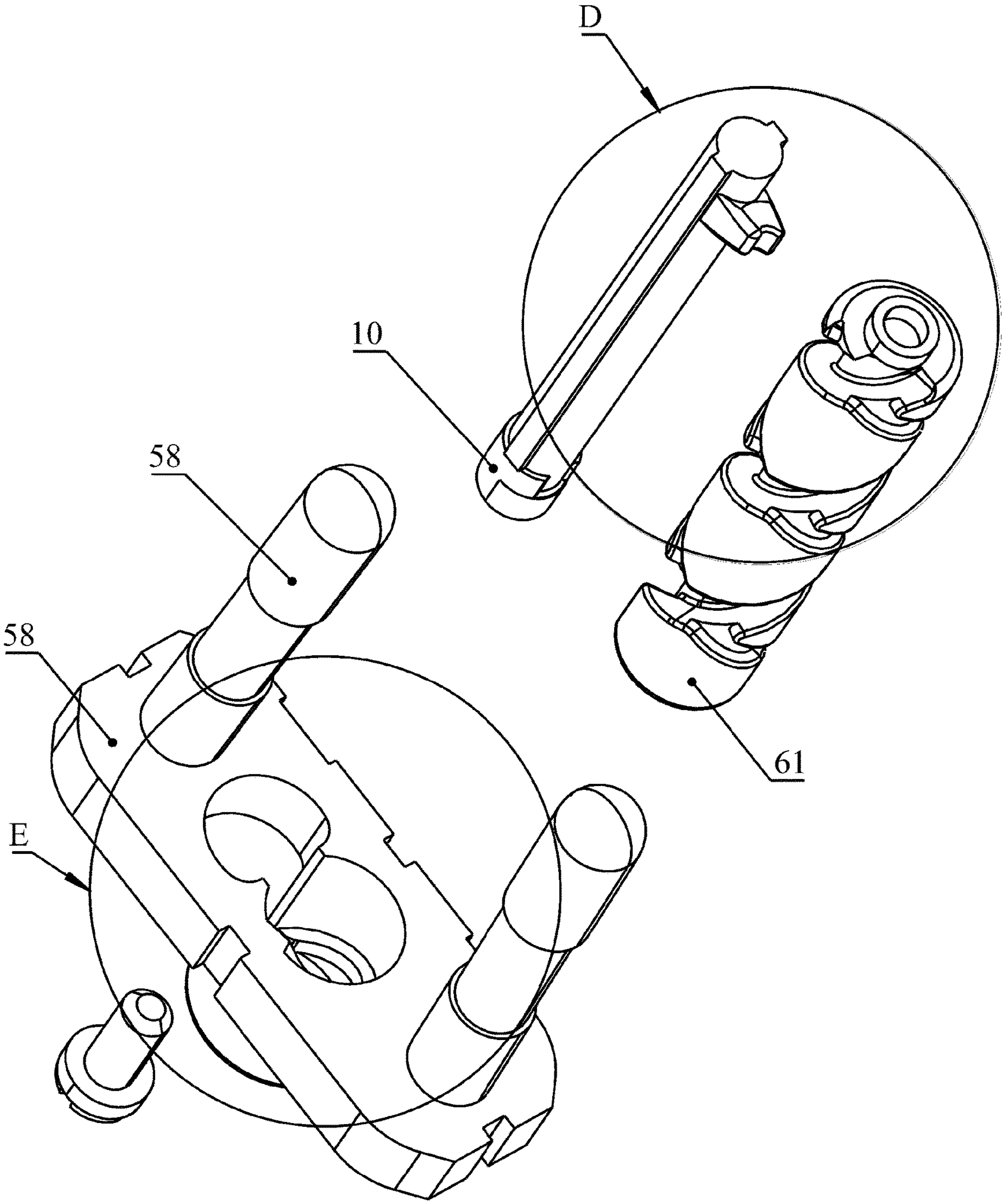
FIG. 13 is a schematic structural diagram of the movable seat and bidirectional screw rod shown in FIG. 2.
Figure 14:
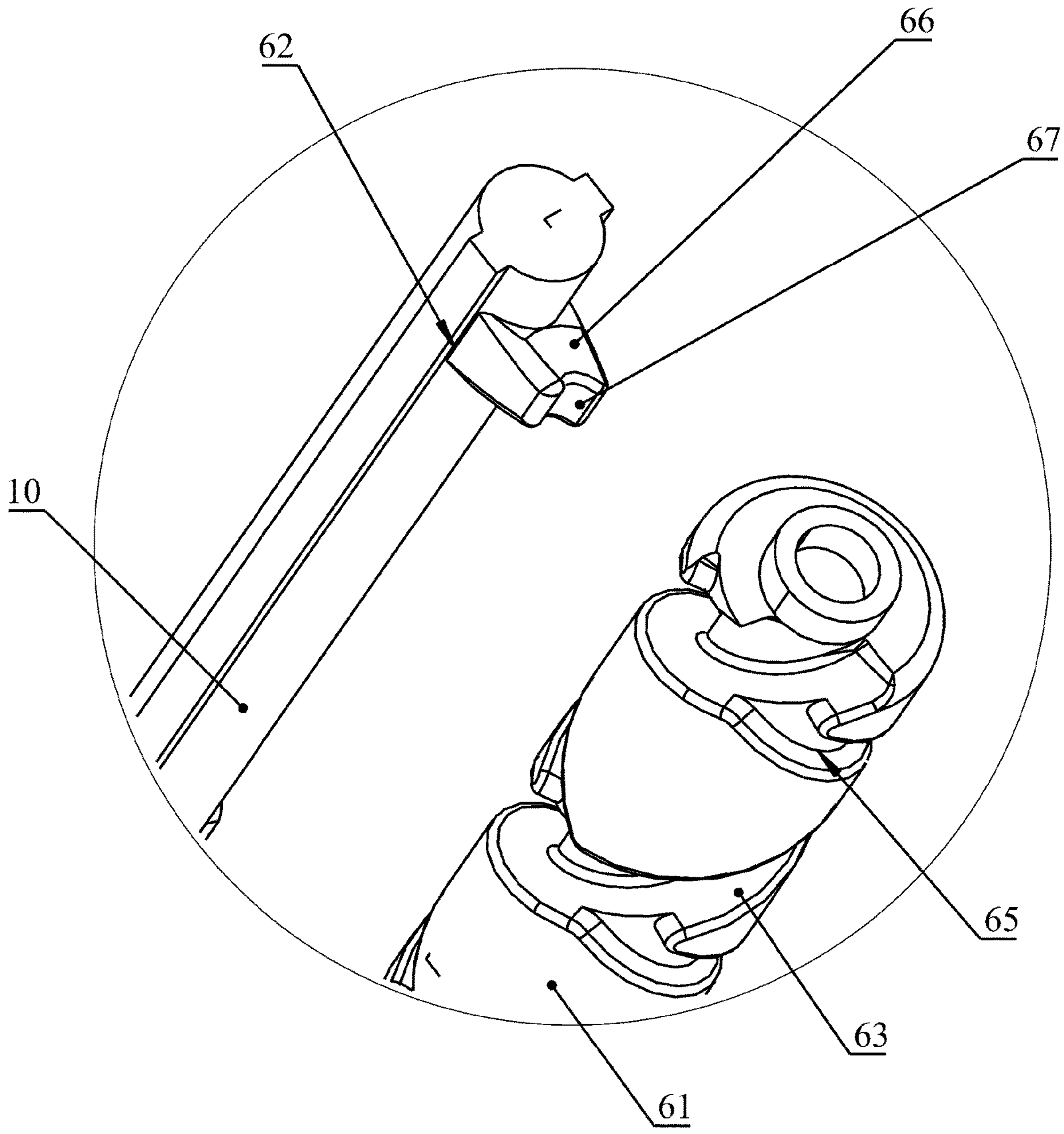
FIG. 14 is an enlarged view of section D in FIG. 13.
Figure 15:
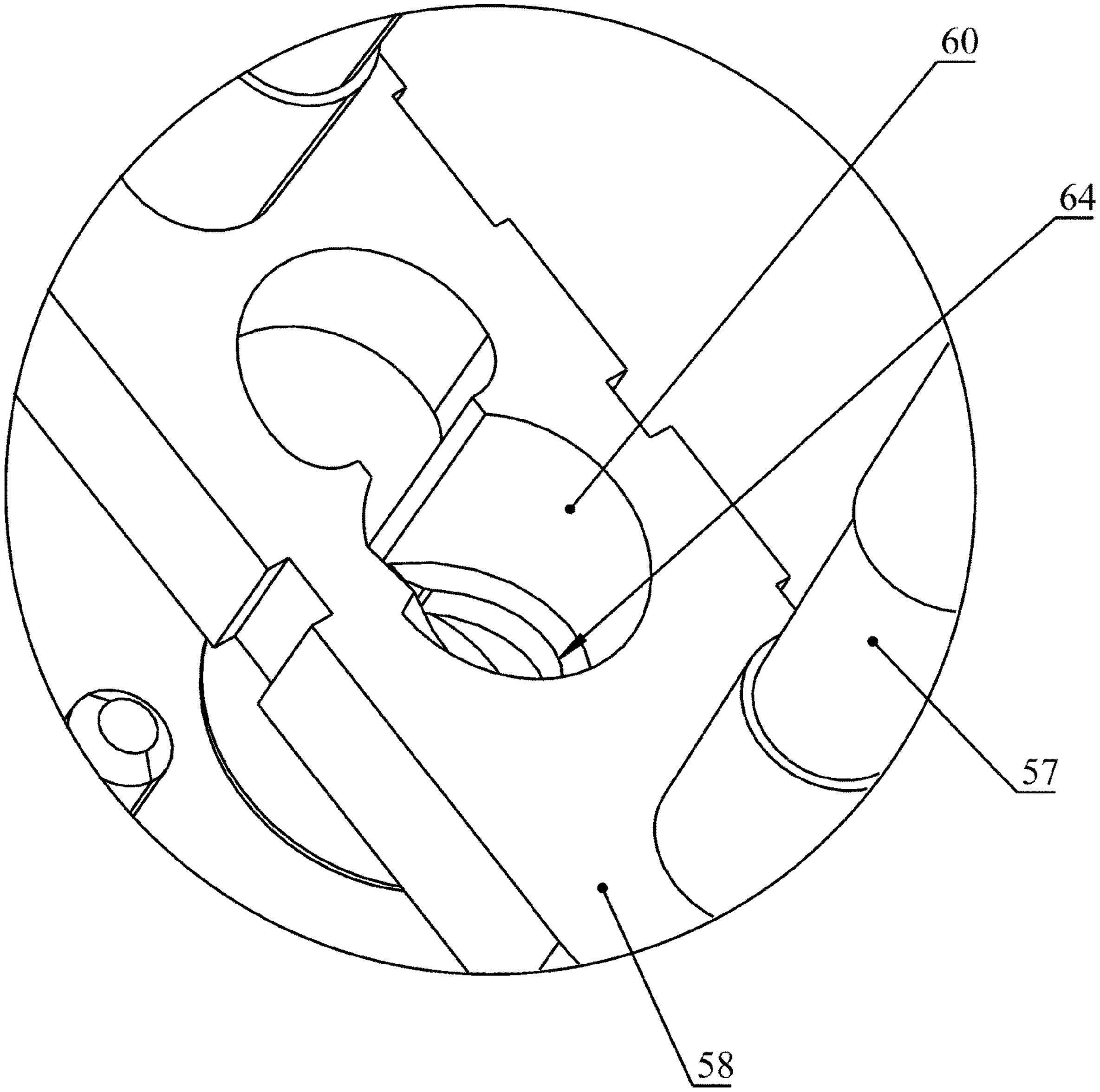
FIG. 15 is an enlarged view of section E in FIG. 13.
Figure 16:
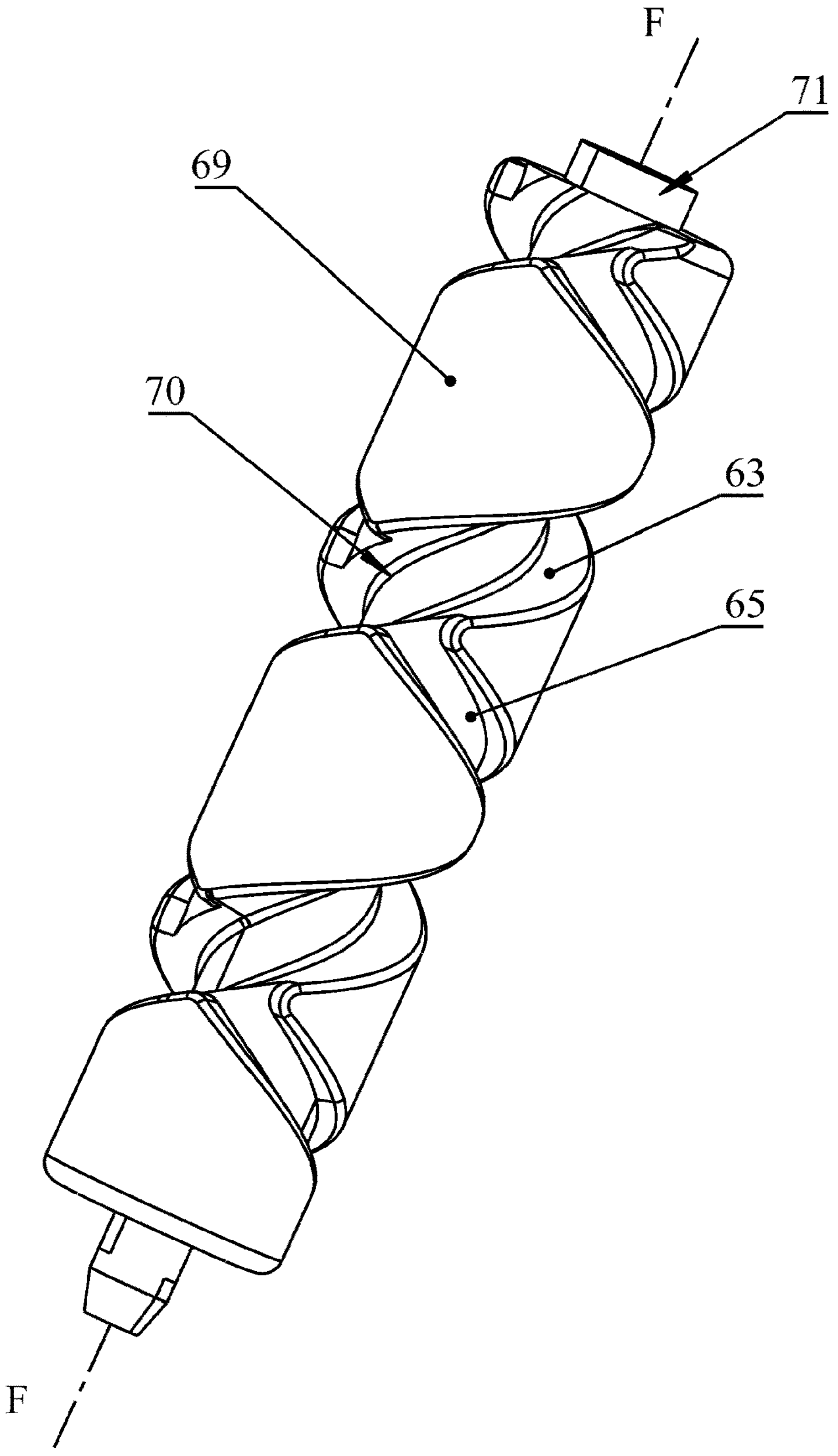
FIG. 16 is a schematic structural diagram of the bidirectional screw rod in FIG. 13.
Figure 17:
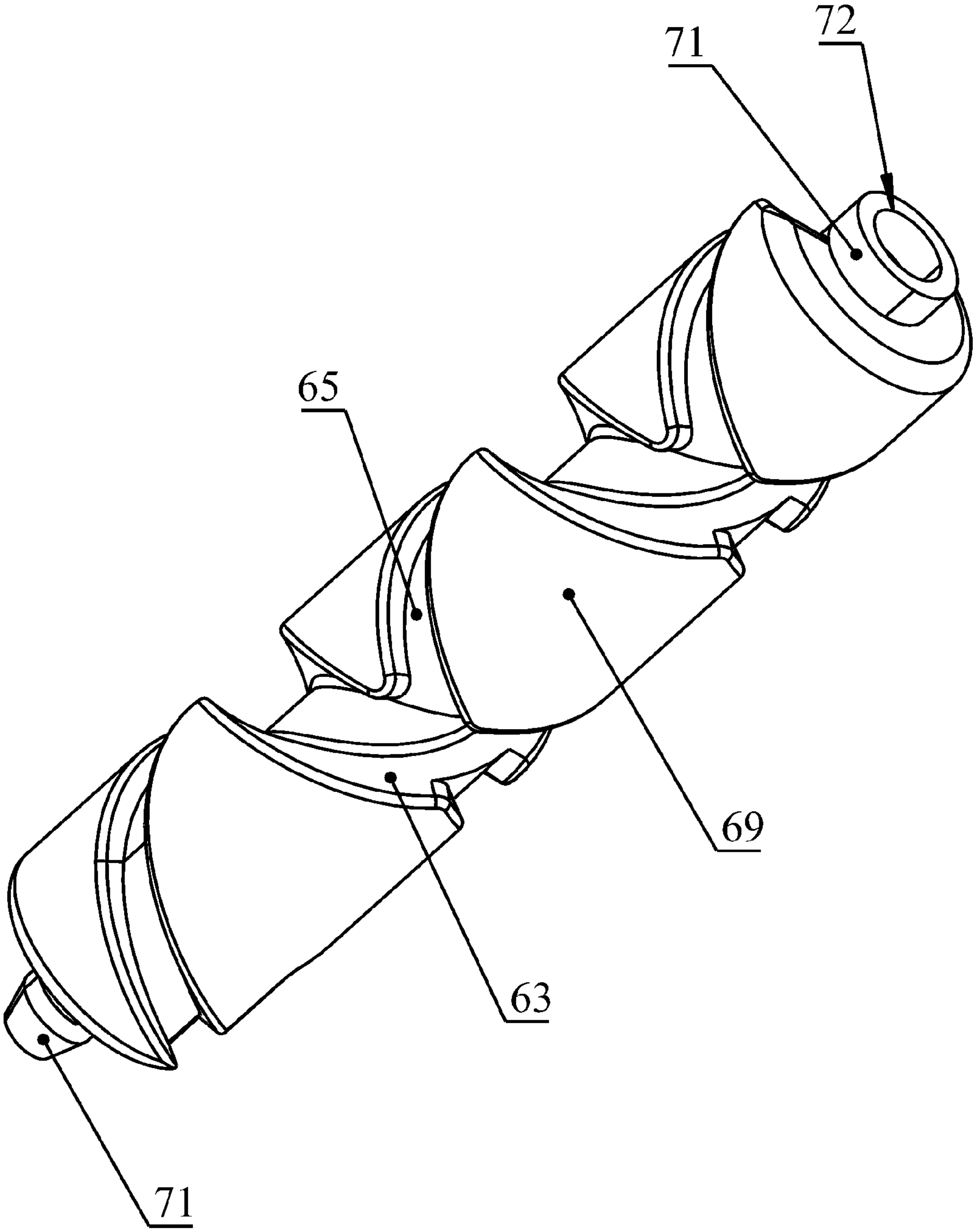
FIG. 17 is a schematic structural diagram of the bidirectional screw rod in FIG. 16 from another angle.
Figure 18:
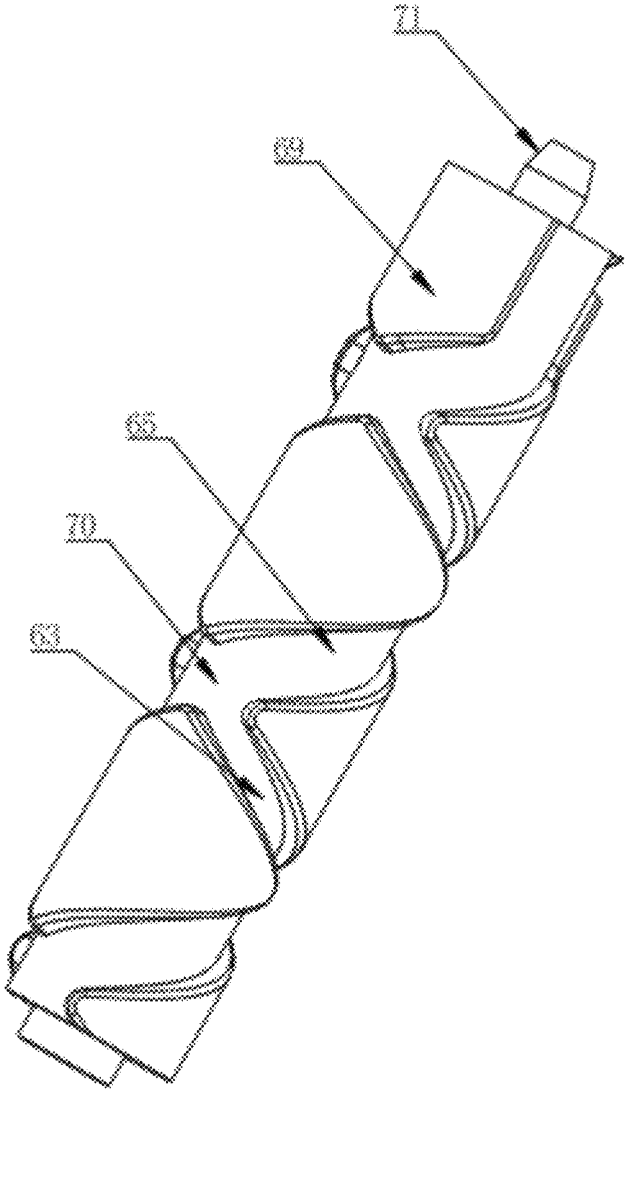
FIG. 18 is a schematic structural diagram showing the same groove depth for the two sets of spiral grooves in the bidirectional screw rod of the present disclosure.

Please also refer to FIGS. 4, 5, and 6. The opening end of the accommodation cavity 13 of the base housing 1 is covered by a rotatable upper rotating cover 3. On the end face of the upper rotating cover 3 facing the drive ring 2, a plurality of evenly spaced first engagement protrusions 31 (as shown in FIG. 6) are provided. Correspondingly, on the end face of the drive ring 2 facing the upper rotating cover 3, a plurality of first engagement grooves 21 matching the first engagement protrusions 31 are evenly distributed along the circumferential direction. By precisely embedding the first engagement protrusions 31 of the upper rotating cover 3 into the first engagement grooves 21 of the drive ring 2, a reliable connection and torque transmission between the two can be achieved. This connection method allows users to directly and synchronously drive the underlying drive ring 2 to rotate simply by rotating the upper rotating cover 3. It should be noted that the number of first engagement grooves 21 and first engagement protrusions 31 does not necessarily have to be plural. In specific designs, only one first engagement groove 21 and one corresponding first engagement protrusion 31 may be provided. Through the engagement of a single protrusion and groove, the reliable connection and synchronous rotation between the upper rotating cover 3 and the drive ring 2 can be realized. In some embodiments, the drive ring 2 and the upper rotating cover 3 can be designed and manufactured as an inseparable integrated component. In other embodiments, the connection between the drive ring 2 and the upper rotating cover 3 can also be achieved using fasteners. For example, bolts, screws, or other fasteners can be used to lock and secure the upper rotating cover 3 and the drive ring 2. This method facilitates assembly, disassembly, and maintenance but requires corresponding mounting holes to be designed on the components.

The upper rotating cover 3 has a circular central hole 32 at its center, into which the fixed cover 4 is assembled, matching the shape of the central hole 32. The inner wall of the central hole 32 is equipped with an upper limiting flange 33, while the outer periphery of the fixed cover 4 correspondingly features a lower limiting flange 42. This lower limiting flange 42 is positioned above the upper limiting flange 33 (i.e., on the side away from the drive ring 2) and abuts against the upper limiting flange 33. The fixed cover 4 extends inward toward the accommodation cavity 13 to form a central fixed shaft 41. This central fixed shaft 41 passes through the accommodation cavity 13, and its end is securely fastened to the base plate 11 of the base housing 1 through bolts. The fixation of the central fixed shaft 41, combined with the abutment and engagement of the lower limiting flange 42 and the upper limiting flange 33, provides axial support for the synchronized rotation of the upper rotating cover 3 and the drive ring 2. This configuration allows the upper rotating cover 3 to rotate freely relative to the fixed cover 4 while effectively restricting axial displacement of the upper rotating cover 3 through the abutting lower and lower limiting flanges 42 and 33. It should be noted that the bolt passes through the base plate 11 of the base housing 1 and threads into the end of the central fixed shaft 41. The bolt head is located on the outer side of the base plate 11, away from the accommodation cavity 13; the base cover 6 encloses the base plate 11 to conceal the bolt head, enhancing aesthetic appeal.

Please refer to FIGS. 7, 8, 9, and 10 as shown:

The socket body 5 is movably positioned within the accommodation cavity 13. The fixed cover 4 is provided with a socket extension hole 43 that matches the shape and size of the socket body 5. In this embodiment, the socket body 5 is configured to extend outward through the socket extension hole 43 or retract back into the accommodation cavity 13.

Specifically, a drive slider 51 is fixedly mounted on the outer side of the socket body 5. The inner wall of the drive ring 2, i.e., the side close to the socket body 5, is provided with a lifting guide rail 22 of a specific arc shape. The drive slider 51 abuts against the curved wall surface of the lifting guide rail 22. When the drive ring 2 is rotated by the upper rotating cover 3, the curved wall surface of the lifting guide rail 22 acts on the drive slider 51, forcing the socket body 5 to move along a preset direction (vertical in this embodiment). At this time, the socket body 5 can extend outward through the socket extension hole 43. It should be noted that in some embodiments, the lifting guide rail 22 can be designed as a groove structure. In this case, the drive slider 51 acts on the inner wall of the groove (i.e., the curved wall surface of the lifting guide rail 22), also driving the socket body 5 to move along the preset direction. This structure not only allows the socket body 5 to extend during forward rotation but also retracts the socket body 5 back into the accommodation cavity 13 when the upper rotating cover 3 is rotated in reverse. In other embodiments, a plurality of sets of end-to-end connected lifting guide rails 22 can be arranged on the inner wall of the drive ring 2. Thus, when the upper rotating cover 3 is continuously rotated in the same direction, the socket body 5 can be forced to perform a reciprocating (cyclic) motion of extension and retraction along a preset trajectory.

To ensure the socket body 5 moves along a precise linear lifting trajectory within the accommodation cavity 13, at least one guide rod 8 is installed inside the cavity. Both ends of the guide rod 8 are fixed to the inner side of the fixed cover 4 and the base plate 11 of the base housing 1, respectively, establishing a stable vertical guiding reference within the accommodation cavity 13. A guide bushing 52 is fixedly mounted on the socket body 5 and precisely sleeved onto the guide rod 8. When the socket body 5 performs lifting motion, the guide bushing 52 slides smoothly along the length of the guide rod 8, effectively constraining the movement path of the socket body 5 and preventing deviation or rotation. It should be noted that there are many ways to fix the guide rod 8 within the accommodation cavity 13. In some embodiments, both ends of the guide rod 8 are securely fastened to the fixed cover 4 and the base plate 11 through bolts for reliable fixation. In other embodiments, positioning slots are provided on the inner side of the fixed cover 4 facing the base plate 11 and the upper surface of the base plate 11 facing the fixed cover 4. During installation, the ends of the guide rod 8 are correspondingly inserted into these positioning slots, achieving stable installation within the accommodation cavity 13.

To precisely control the lifting stroke and final position of the socket body 5 (the e socket body 5 is fully extended or fully retracted) and to limit the rotation angle of the drive ring 2, at least one limiting stopper 132 is provided on the annular sliding track 131 of the base housing 1. Correspondingly, the bottom of the drive ring 2 is equipped with a matching limiting notch 23. When the user rotates the drive ring 2 to a preset angle—for example, corresponding to the endpoint position where the socket body 5 is fully extended or fully retracted the limiting stopper 132 is engaged with the limiting notch 23, forming a fitted contact. This engagement effectively locks the relative position between the drive ring 2 and the base housing 1, mechanically preventing further rotation of the drive ring 2 and ensuring the socket body 5 accurately reaches and remains stably at the set position. It is important to note that when the limiting stopper 132 is within the limiting notch 23, the user only needs to apply a slightly greater rotational force to the drive ring 2 to disengage the limiting stopper 132 from the limiting notch 23. Once disengaged, the drive ring 2 can resume free rotation, allowing the user to readjust the angle and control the stroke. This design provides clear endpoint positioning while retaining operational flexibility.

A first fixed rod 9 is installed inside the base housing 1. One end of the first fixed rod 9 is secured to the side of the fixed cover 4 near the accommodation cavity 13. A sliding sleeve 53 is fixedly arranged on the outer side wall of the socket body 5. This sliding sleeve 53 is precisely fitted over the first fixed rod 9 and slides along its axial direction. A return spring 68 is sleeved on the first fixed rod 9 between the sliding sleeve 53 and the fixed cover 4. When the socket body 5 needs to extend outward, the sliding sleeve 53 on its exterior moves accordingly along the first fixed rod 9. This movement compresses the return spring 68 located between the sliding sleeve 53 and the fixed cover 4, causing the return spring 68 to store elastic potential energy. The extension stroke of the socket body 5 is ultimately precisely limited by the limiting stopper 132. When the socket body 5 reaches the fully extended position and is blocked by the limiting stopper 132, the return spring 68 remains in a preset compressed state, ready to provide a restoring force at any moment. When it needs to retract the socket body 5 back into the accommodation cavity 13, the driving constraint on it is simply released. At this point, the compressed return spring 68 rapidly releases its stored elastic potential energy, generating a restoring force. This restoring force acts directly on the sliding sleeve 53, pushing it along the first fixed rod 9 toward the base plate 11. Since the sliding sleeve 53 is fixed to the socket body 5, the restoring force of the return spring 68 effectively drives the entire socket body 5 smoothly and reliably back into the accommodation cavity 13 of the base housing 1. This design of assisted reset with the return spring 68 greatly facilitates user operation, ensuring the socket body 5 can automatically and smoothly return to its original position.

Please also refer to FIGS. 11, 12, 13, 14, 15, 16, 17, and 18;

Specifically, the socket body 5 includes a main housing 54, which consists of an upper housing 541 and a lower housing 542. An accommodation space 55 is formed inside the main housing 54, and two first through holes 56 are opened at the top of the main housing 54. The accommodation space 55 is equipped with a movable seat 57 and two sets of plug terminals 58 mounted on the movable seat 57. The plug terminals 58 are used to contact an external power source for power supply, and their positions correspond to the two first through holes 56, respectively.

The accommodation space 55 is equipped with a bidirectional screw rod 61, whose two ends are supported on the inner wall of the accommodation space 55 through bearings or other movable connection methods, allowing it to rotate around its own axis. The movable seat 57 is provided with a second through hole 60, through which the bidirectional screw rod 61 passes, with its length direction defining the movement direction of the socket body 5. The outer peripheral side of the bidirectional screw rod 61 is machined with a specially structured helical sliding groove. More precisely, the bidirectional screw rod 61 includes a shaft body 69, which forms the main part of the bidirectional screw rod and has a cylindrical or approximately cylindrical basic profile. On the outer cylindrical surface of the shaft body 69, a first helical sliding groove 63 and a second helical sliding groove 65 are machined along its axial direction (i.e., the F-F direction shown in FIG. 17). The orthographic projections of the first helical sliding groove and the first helical sliding groove 63 and 65 are interleaved in the same circumferential direction of the screw rod (typically referring to a view perpendicular to the axial direction) and form a transition groove section 70 at the intersection of their projections. The edges where the inner wall and bottom wall of both the first helical sliding groove and the second helical sliding groove intersect are machined into chamfers to ensure smooth transitions in the internal contours of the first helical sliding groove 63 and the second helical sliding groove 65.

Both ends of the shaft body 69 are equipped with a set of connectors 71 for reliably and rotatably installing the entire bidirectional screw rod 61 onto a fixed socket body, enabling the bidirectional screw rod 61 to freely rotate around its own axis (i.e., the axial direction of the shaft body 69). These two sets of connectors 71 serve as the rotational support points for the bidirectional screw rod 61.

The first set of connectors is located at one end of the shaft body 69. This set of connectors 71 is designed in a rod-like shape, with its cross-sectional area gradually decreasing along the direction away from the center of the shaft body 69, forming a structure similar to a cone or stepped shaft. This design may aid in stress distribution, weight reduction, ease of insertion into bearings, or meeting specific spatial constraints. The second set of connectors is located at the other end of the shaft body 69. This set of connectors 71 also features a rod-like structure. On the end face farthest from the shaft body 69, a rotary groove 72 is machined. The function of this rotary groove 72 is typically to accommodate and position a rotary pin, retaining ring, or drive key, used to transmit torque (driving the rotation of the bidirectional screw rod 61) or achieve axial positioning, ensuring the rotational motion of the bidirectional screw rod 61 within the socket body is precisely controlled and transmitted.

The socket body 5 is installed within the accommodation cavity 13 of the base housing 1. A second fixed rod 10 is fixed to the base plate 11 of the base housing 1, extending upward with one end passing through the bottom of the main housing 54 and extending into the accommodation space 55. The end of the second fixed rod 10 within the accommodation space 55 is fixed with a first abutment block 62. The first abutment block 62 includes an accommodation part 66 and an abutment part 67. The accommodation part 66 has a shape that precisely matches the inner cavity of the first helical sliding groove 63 and is embedded within the first helical sliding groove 63. This ensures that the first helical sliding groove 63 can effectively transmit motion to the bidirectional screw rod 61. The abutment part 67 is located on the side of the accommodation part 66 facing the center of the bidirectional screw rod 61 and is designed as an inwardly concave curved surface. This curved surface contacts the bottom end face of the first helical sliding groove 63, significantly improving the stability and force distribution of the bidirectional screw rod 61 during rotation, reducing vibration and wear. It should be noted that the groove depth of the first helical sliding groove is set to be no less than that of the second helical sliding groove, preventing the first abutment block 62 from disengaging from the first helical sliding groove and entering the second helical sliding groove during movement.

The movable seat 57 is provided with a second abutment block 64 on the inner wall of the second through hole 60. The second abutment block 64 is designed as an arc-shaped strip structure and is embedded in the second helical sliding groove 65 arranged on the outer periphery of the bidirectional screw rod 61. It should be noted that the position of the second abutment block 64 on the movable seat 57 can also be customized according to actual production needs, for example: the second abutment block 64 can be set on the side wall of the movable seat 57.

When the user rotates the upper rotating cover 3 and the drive ring 2, the entire socket body 5 moves relative to the base housing 1. At this time, the second fixed rod 10 fixed to the base housing 1 and its first abutment block 62 remain stationary. As the socket body 5 moves, the first abutment block 62 embedded in the first helical sliding groove 63 is guided by the first helical sliding groove 63 (helical groove), forcing the bidirectional screw rod 61 to rotate around its own axis.

When the bidirectional screw rod 61 rotates, the second abutment block 64 fixed on the movable seat 57 engages into the second helical sliding groove 65. The second abutment block 64 is thus guided by the second helical sliding groove 65 (also a helical groove, designed to be linked with the first helical sliding groove 63) to move. This ultimately drives the second abutment block 64 and the entire movable seat 57 to move linearly along the length direction of the bidirectional screw rod 61. The linear motion of the movable seat 57 synchronizes the movement of the two sets of plug terminals 58 on it, enabling the plug terminals 58 to extend to the power supply position or retract to the storage position, and be precisely aligned with and pass through the first through hole 56 at the top of the main housing 54.

Specifically, the accommodation cavity 13 houses the core circuit board (not shown). At specific positions on this circuit board, charging connectors (not shown) are installed.

To facilitate external connections, the base plate 11 of the base housing 1 and the base cover 6 are precisely provided with openings at positions corresponding to the charging connectors. When the plug is connected to an external power socket through its plug terminals 58, the matching charging device can be inserted through the openings on the base plate 11 and base cover 6, establishing physical and electrical connections with the charging connectors on the circuit board, thereby introducing external power into the device for power supply.

Figure 19:
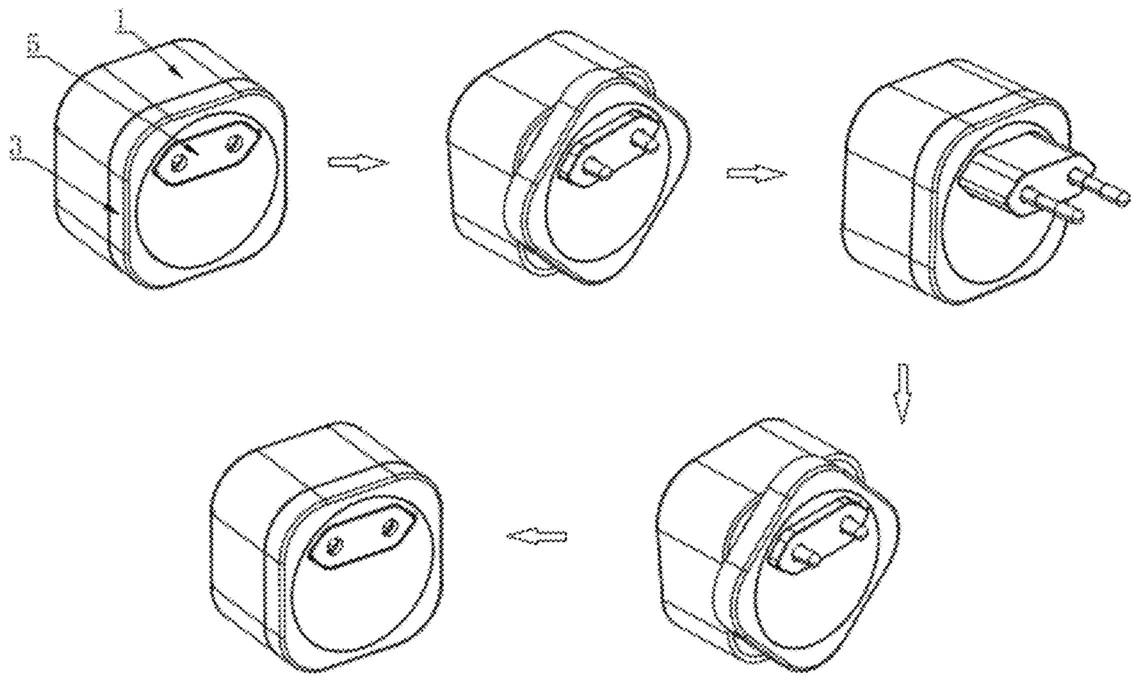
FIG. 19 is a usage state diagram of the socket in the present disclosure.
Figure 20:
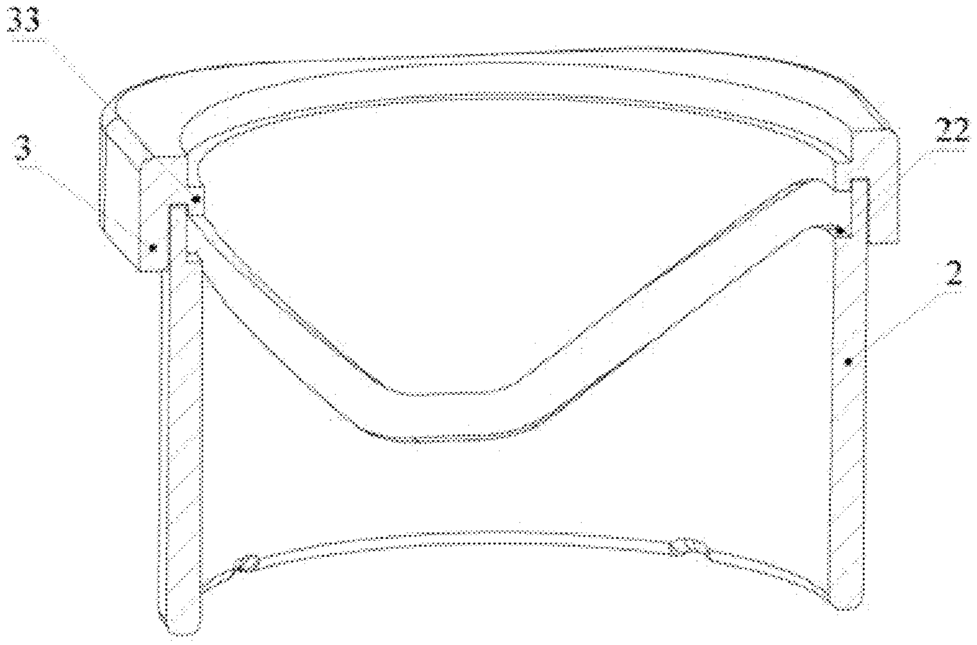
FIG. 20 is a schematic diagram showing the grooved structure of the lifting guide rail 22 in the device.

Refer to FIG. 19. The operation of this plug, 100, is an intuitive rotational drive process that achieves the overall lifting of the socket body 5 and the automatic extension/retraction of the internal plug terminals 58:

During Use:

Step 1: the upper cover is rotated—the user grips and rotates the upper rotating cover 3 clockwise (or counter-clockwise).

Step 2: drive ring 2 acts in linkage—the first engagement protrusion 31 at the bottom of the upper rotating cover 3 drives the engaged drive ring 2 to rotate synchronously.

Step 3: elevation of the socket body 5—the lifting guide rail 22 on the inner wall of the drive ring 2 acts on the embedded drive slider 51, converting rotational motion into linear motion, pushing the entire socket body 5 upward along the guide rod 8 against the resistance of the return spring 68. This process compresses the return spring 68 to store energy.

Step 4: the bidirectional screw rod 61 is rotated—while the socket body 5 moves upward as a whole, the second fixed rod 10 fixed to the base plate 11 and its first abutment block 62 at the end move downward relative to the moving socket body 5. The first abutment block 62 moves along the first helical sliding groove 63 on the bidirectional screw rod 61. Due to the helical structure of the groove, the bidirectional screw rod 61 is forced to rotate around its axis.

Step 5: the plug terminals 58 extends out—the rotational motion of the bidirectional screw rod 61 is converted into linear motion of the movable seat 57 along the screw axis (i.e., vertically upward) through the engagement of its second helical sliding groove 65 with the second abutment block 64 on the movable seat 57. The movable seat 57 drives the two sets of plug terminals 58 thereon to move upward synchronously.

Step 6: locking in position—when the socket body 5 rises to the fully extended position, the limiting notch 23 at the bottom of the drive ring 2 is engaged with the limiting stopper 132 on the annular sliding track 131 of the base housing 1, providing a clear sense of positioning and preventing further rotation of the drive ring 2. At this point, the plug terminals 58 have also precisely moved into position, passing through the first through hole 56 at the top of the main housing 54, ready for insertion into the power socket. The socket body 5 is now fully extended and locked, with the internal plug terminals 58 fully extended.

During Storage:

Step 1: the rotating upper cover is unlocked—the user applies a slightly greater rotational force to the upper rotating cover 3, causing the limiting notch 23 of the drive ring 2 to overcome the obstruction of the limiting stopper 132 and disengage. Then, the upper rotating cover 3 is rotated in the opposite or same direction as during extension.

Step 2: the drive ring 2 acts in linkage—the upper rotating cover 3 drives the rotation of the drive ring 2.

Step 3: elevation of the socket body 5—the compressed return spring 68 releases stored energy, generating a downward restoring force that acts on the sliding sleeve 53, pushing the entire socket body 5 smoothly and quickly back into the accommodation cavity 13 of the base housing 1 along the guide rod 8.

Step 4: the bidirectional screw rod 61 is reversely rotated—while the socket body 5 moves downward as a whole, the second fixed rod 10 fixed to the base plate 11 and its first abutment block 62 at the end move upward relative to the descending socket body 5. The first abutment block 62 moves in reverse along the first helical sliding groove 63, forcing the bidirectional screw rod 61 to rotate in reverse.

Step 5: plug terminals 58 is retracted—the reverse rotation of the bidirectional screw rod 61, through the engagement of the second helical sliding groove 65 with the second abutment block 64, drives the movable seat 57 and the plug terminals 58 to retract along the screw axis (i.e., vertically downward) back into the main housing 54.

Step 6: locking in position—when the socket body 5 is fully retracted into the accommodation cavity 13, another limiting notch 23 or the same limiting notch 23 at the bottom of the drive ring 2 rotates to another position and is engaged with the corresponding limiting stopper 132, locking the position again. At this point, the socket body 5 is completely hidden, and the plug terminals 58 are fully retracted and protected.

In the description of the present disclosure, it should be appreciated that directional terms such as "front, rear, up, down, left, right", "horizontal, vertical, perpendicular, horizontal" and "top, bottom" etc. indicate the orientation or positional relationship based on the orientation or positional relationship shown in the drawings, and are only for the convenience of describing the present disclosure and simplifying the description. In the absence of a contrary explanation, these directional terms do not indicate or imply that the device or element referred to must have a specific orientation or be constructed and operated in a specific orientation, and therefore should not be understood as limiting the scope of protection of the present disclosure; the directional terms "inside, outside" refer to the inside and outside relative to the contour of each component itself.

For the convenience of description, spatial relative terms such as "on . . . ", "above . . . ", "on the upper surface of . . . ", "upper" etc. may be used here to describe the spatial positional relationship of a device or feature with other devices or features as shown in the drawings. It should be appreciated that spatial relative terms are intended to encompass different orientations of the device in use or operation other than the orientation described in the drawings. For example, if the device in the drawing is inverted, the device described as "above other devices or structures" or "on other devices or structures" will subsequently be positioned as "below other devices or structures" or "under other devices or structures". Thus, the exemplary term "above" can include both "above" and "below" orientations. The device can also be positioned in other different ways (rotated 90 degrees or in other orientations), and the spatial relative descriptions used here should be interpreted accordingly.

In addition, it should be noted that the use of terms such as "first", "second" etc. to define components is for the convenience of distinguishing the corresponding components. Unless otherwise stated, the above terms have no special meaning, and therefore should not be understood as limiting the scope of protection of the present disclosure.

The above description is only a preferred embodiment of the present disclosure and is not intended to limit the present disclosure. For those skilled in the art, the present disclosure can have various modifications and changes. Any modifications, equivalent replacements, improvements etc. made within the spirit and principles of the present disclosure should be included within the scope of protection of the present disclosure.

What is claimed is:

1. A drive shaft for a retractable power plug, comprising:

a shaft body provided with a first helical sliding groove and a second helical sliding groove in an axial direction on an outer surface thereof, wherein the first helical sliding groove and the second helical sliding groove have overlapping orthographic projections in a same direction, forming a transition groove section at an intersection of the projections; and the first helical sliding groove is configured to guide a first abutment block engaged therewith to move in the axial direction of the shaft body; and the second helical sliding groove is configured to guide a second abutment block engaged therewith to move in the axial direction of the shaft body, wherein a groove depth of the first helical sliding groove is equal to or greater than that of the second helical sliding groove to prevent the first abutment block in the first helical sliding groove from disengaging from the first helical sliding groove and entering the second helical sliding groove; and a connector arranged at one end of the shaft body for rotatably installing the drive shaft onto a power plug, enabling the drive shaft to rotate around the axial direction of the shaft body.

2. The drive shaft according to claim 1, wherein the connector is rod-shaped, with a cross-sectional area decreasing in a direction away from the shaft body.

3. The drive shaft according to claim 1, wherein the connector is rod-shaped, and a rotary groove is provided at an end of the connector away from the shaft body.

4. The drive shaft according to claim 1, wherein chamfers are machined at intersections of inner walls and bottom walls of both the first helical sliding groove and the second helical sliding groove.

5. A drive shaft for a retractable power plug, comprising:

a shaft body, provided with a first helical sliding groove and a second helical sliding groove in an axial direction on an outer surface thereof, wherein the first helical sliding groove and the second helical sliding groove have overlapping orthographic projections in a same direction, forming a transition groove section at an intersection of the projections; and the first helical sliding groove is configured to guide a first abutment block engaged therewith to move in the axial direction of the shaft body; and the second helical sliding groove is configured to guide a second abutment block engaged therewith to move in the axial direction of the shaft body; and a connector arranged at one end of the shaft body for rotatably installing the drive shaft onto a power plug, enabling the drive shaft to rotate around the axial direction of the shaft body; and wherein when the drive shaft rotates, the first abutment block in the first helical sliding groove and the second abutment block in the second helical sliding groove interact, moving together in the axial direction of the shaft body.

6. The drive shaft according to claim 5, wherein the connector is rod-shaped, with a cross-sectional area decreasing in a direction away from the shaft body.

7. The drive shaft according to claim 5, wherein the connector is rod-shaped, and a rotary groove is provided at an end of the connector away from the shaft body.

8. The drive shaft according to claim 5, wherein chamfers are machined at intersections of inner walls and bottom walls of both the first helical sliding groove and the second helical sliding groove.

9. A drive assembly applied to a retractable power plug, comprising:

a base housing, with a first abutment block fixedly mounted thereon; and a shaft body provided with a first helical sliding groove and a second helical sliding groove in an axial direction on an outer surface thereof, wherein the first helical sliding groove and the second helical sliding groove have overlapping orthographic projections in a same direction, forming a transition groove section at an intersection of the projections; and the first abutment block is embedded in the first helical sliding groove, so that when the first abutment block moves along a path of the first helical sliding groove, the first abutment block drives the shaft body to rotate in the axial direction thereof; and the second helical sliding groove is configured to guide a second abutment block engaged therewith to move in the axial direction of the shaft body; and a connector arranged at one end of the shaft body for rotatably installing a drive shaft onto a power plug; and wherein when the first abutment block slides along a path of the first helical sliding groove and drives the shaft body to rotate, the second abutment block in the second helical sliding groove moves in the axial direction of the shaft body.

10. The drive assembly according to claim 9, wherein a groove depth of the first helical sliding groove is equal to or greater than that of the second helical sliding groove to prevent the first abutment block in the first helical sliding groove from disengaging from the first helical sliding groove and entering the second helical sliding groove.

11. The drive assembly according to claim 9, wherein the connector is rod-shaped, with a cross-sectional area decreasing in a direction away from the shaft body.

12. The drive assembly according to claim 9, wherein the connector is rod-shaped, and a rotary groove is provided at an end of the connector away from the shaft body.

13. The drive assembly according to claim 9, wherein chamfers are machined at intersections of inner walls and bottom walls of the first helical sliding groove and the second helical sliding groove.

14. The drive assembly according to claim 9, wherein the first abutment block comprises an accommodation part and an abutment part, the accommodation part matches a shape of a cavity of the first helical sliding groove, and the abutment part is an inwardly recessed curved surface in contact with a bottom end face of the first helical sliding groove.

15. The drive assembly according to claim 9, further comprising a drive assembly and a socket body, wherein the drive assembly and the socket body are both arranged within a base housing; and the drive assembly is configured to: in response to a user operation, drive the socket body to move along a preset direction; and the socket body comprises:

a main housing, with at least one first through hole provided thereon; and a movable seat slidably arranged within the main housing; and a plug terminal fixed on the movable seat and corresponding in position to the first through hole, wherein the movable seat is fixedly provided with a second abutment block embedded in the second helical sliding groove; and when the socket body moves, the first abutment block forces the shaft body to rotate through engagement with the first helical sliding groove; the rotation of the shaft body drives the movable seat to move in the axial direction of the shaft body through engagement between the second helical sliding groove and the second abutment block, thereby causing the plug terminal to extend out of or retract from the first through hole.

16. The drive assembly according to claim 15, wherein the drive assembly comprises a drive ring and an upper rotating cover, wherein the base housing forms an accommodation cavity with a top opening, the drive ring is rotatably arranged within the accommodation cavity, and the upper rotating cover covers the opening of the accommodation cavity and is drivingly connected to the drive ring to rotate synchronously; and the socket body is movably arranged within the accommodation cavity, an outer side of the socket body is provided with a drive slider, an inner wall of the drive ring is provided with a lifting guide rail, and the drive slider is engaged with the lifting guide rail in a sliding manner, so that when rotating, the drive ring pushes the socket body to move in a preset direction.

17. The drive assembly according to claim 16, wherein the upper rotating cover is provided with a first engagement protrusion, and the drive ring is provided with a first engagement groove matching the first engagement protrusion.

18. The drive assembly according to claim 16, wherein the upper rotating cover and the drive ring are of an integrally formed structure.

19. The drive assembly according to claim 16, wherein the upper rotating cover is fixedly connected to the drive ring through a fastener.

20. The drive assembly according to claim 16, wherein the inner wall of the drive ring is provided with a plurality of sets of end-to-end connected lifting guide rails.

* * * * *